(12) United States Patent
Ito et al.

(10) Patent No.: US 12,294,268 B2
(45) Date of Patent: May 6, 2025

(54) CONDUCTIVE UNIT

(71) Applicant: HONDA MOTOR CO., LTD., Tokyo (JP)

(72) Inventors: Kazuki Ito, Tokyo (JP); Masato Fujioka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 18/125,470

(22) Filed: Mar. 23, 2023

(65) Prior Publication Data

US 2023/0318388 A1 Oct. 5, 2023

(30) Foreign Application Priority Data

Mar. 30, 2022 (JP) .................... 2022-056567

(51) Int. Cl.
*H02K 3/50* (2006.01)

(52) U.S. Cl.
CPC ........... *H02K 3/50* (2013.01); *H02K 2203/09* (2013.01)

(58) Field of Classification Search
CPC .. H02K 5/00; H02K 5/10; H02K 5/22; H02K 5/225; H02K 3/00; H02K 3/50; H02K 11/00; H02K 11/009; H02K 11/33; H01R 24/00; H01R 24/38; H01R 13/00; H01R 13/52; H01R 13/521; H01R 13/63; H01R 13/631; H01R 13/6315; H01R 13/65; H01R 13/658; H01R 13/6581

See application file for complete search history.

(56) References Cited

U.S. PATENT DOCUMENTS

| | | | | |
|---|---|---|---|---|
| 4,690,478 | A * | 9/1987 | Rahrig | H01R 13/521 439/852 |
| 9,882,315 | B2 * | 1/2018 | Neureiter | H01R 24/38 |
| 2011/0316373 | A1 | 12/2011 | Kobayashi et al. | |

FOREIGN PATENT DOCUMENTS

| | | | | |
|---|---|---|---|---|
| JP | 2003134724 A * | 5/2003 | ............... | H02K 3/50 |
| WO | WO 2011/055806 A1 | 5/2011 | | |

* cited by examiner

*Primary Examiner* — Tran N Nguyen
(74) *Attorney, Agent, or Firm* — Paratus Law Group, PLLC

(57) ABSTRACT

A conductive unit, includes a U-phase conductive member, a V-phase conductive member and an insulating cover. The U-phase conductive member include a U-phase bus bar and a molded member molded integrally with the U-phase bus bar. The V-phase conductive member includes a V-phase bus bar and not including the molded member. The insulating cover separates the U-phase bus bar from the V-phase bus bar apart and is supported only by the molded member.

8 Claims, 5 Drawing Sheets

CONDUCTIVE UNIT

CROSS-REFERENCE TO RELATED APPLICATIONS

The present application claims the benefit of priority of Japanese Patent Application No. 2022-056567, filed on Mar. 30, 2022, the content of which is incorporated herein by reference.

TECHNICAL FIELD

The present invention relates to a conductive unit including a plurality of conductive members.

BACKGROUND ART

In recent years, efforts for realizing a low-carbon society or a decarburized society have been actively made, and in order to reduce $CO_2$ emissions, electrification of a drive source has been rapidly advanced.

Further, in the electrification of a drive source, in order to improve energy efficiency, research and development relating to a rotary electric machine having more excellent energy efficiency and a reduction in loss of electric power at the time of being transferred to and received from the rotary electric machine have been performed.

Generally, a conductive unit such as a bus bar unit including a plurality of conductive members such as bus bars is used to transfer and receive electric power to and from a rotary electric machine. The conductive unit is required to be capable of transferring and receiving large electric power at a low loss while ensuring insulation properties of the conductive members. For example, a conductive unit that includes three conductive members (electric conductors) and an insulating member (inverter terminal block) is disclosed in WO2011/055806A1. The insulating member accommodates the three conductive members and separates the three conductive members from each other.

SUMMARY OF INVENTION

However, in the conductive unit disclosed in WO2011/055806A1, the insulating member (inverter terminal block) is supported by a motor case. Therefore, it is necessary to provide the insulating member (inverter terminal block) with a fixing portion for fixing the insulating member (inverter terminal block) to the motor case, and there is room for improvement in cost reduction and weight reduction.

The present embodiment provides a conductive unit that contributes to the electrification of a drive source for reducing $CO_2$ emissions, and that can achieve cost reduction and weight reduction while ensuring insulation properties of a plurality of conductive members.

The present embodiment provides a conductive unit, including:
  a plurality of conductive members; and
  an insulating member,
  wherein the plurality of conductive members include
    a first conductive member including a conductor and a molded member molded integrally with the conductor, and
    a second conductive member including a conductor and not including the molded member, and
  wherein the insulating member spaces the conductors of the plurality of conductive members apart from each other and is supported only by the molded member.

According to the present embodiment, since the insulating member that spaces the conductors of the plurality of conductive members apart from each other is supported only by the molded member, the insulating member can be fixed without providing the insulating member with a fixing portion for fixing the insulating member. Accordingly, it is possible to achieve cost reduction and weight reduction while ensuring insulation properties of the plurality of conductive members.

BRIEF DESCRIPTION OF DRAWINGS

Exemplary embodiment(s) of the present invention will be described in detail based on the following figures, wherein.

DESCRIPTION OF EMBODIMENTS

Hereinafter, an embodiment of a conductive unit of the present invention will be described with reference to the accompanying drawings. The drawings are to be viewed according to orientation of the reference signs.

Figure 1:
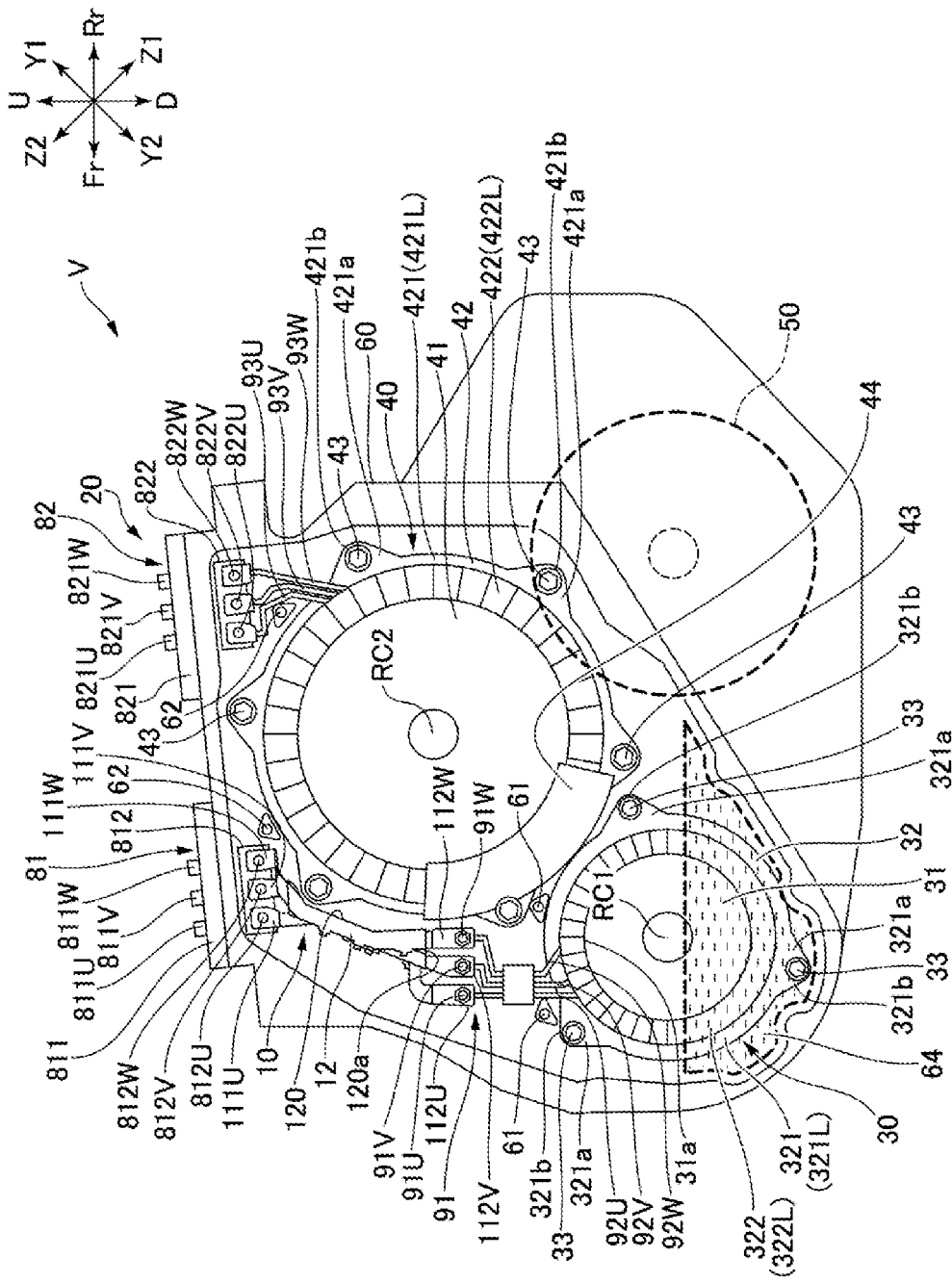
FIG. 1 is a left side view of an internal main portion of a vehicle drive device in which a conductive unit according to an exemplary embodiment of the present invention is mounted.

As illustrated in FIG. 1, a conductive unit 10 of the present embodiment is attached to a vehicle drive device 20 mounted on a vehicle V. In the present specification and the like, in order to simplify and clarify the description, a front-rear direction, a left-right direction, and an up-down direction are described in accordance with directions viewed from a driver of the vehicle V. In FIG. 1, a front side of the vehicle is denoted by Fr, a rear side thereof is denoted by Rr, a left side thereof is denoted by L, a right side thereof is denoted by R, an upper side thereof is denoted by U, and a lower side thereof is denoted by D. The left-right direction is also referred to as a vehicle width direction.

[Overall Configuration of Vehicle Drive Device]

The vehicle drive device 20 includes a first rotary electric machine 30, a second rotary electric machine 40, a transmission device 50, and a drive device case 60. The first rotary electric machine 30, the second rotary electric machine 40, and the transmission device 50 are accommodated in the drive device case 60. A power conversion device (not illustrated) is disposed at an upper surface of the drive device case 60. The conductive unit 10 electrically connects the first rotary electric machine 30 accommodated in the drive device case 60 to the power conversion device (not illustrated) disposed outside the drive device case 60.

[First Rotary Electric Machine]

The first rotary electric machine 30 is a generator that generates electric power using motive power of an internal combustion engine (not illustrated) mounted on the vehicle V. The electric power generated by the first rotary electric machine 30 is supplied to a power storage device (not illustrated) mounted on the vehicle V or the second rotary electric machine 40 via the power conversion device (not illustrated).

The first rotary electric machine 30 includes a first rotor 31 having a substantially annular shape that rotates about a first rotation shaft RC1 extending horizontally in the vehicle width direction of the vehicle V, and a first stator 32 disposed at a predetermined interval in a radial direction from an outer peripheral surface of the first rotor 31.

The first rotor 31 rotates clockwise as viewed from a left side in a direction of the first rotation shaft RC1 during normal driving of the first rotary electric machine 30. Accordingly, during normal driving of the first rotary electric machine 30, an upper end portion 31a of the first rotor 31 rotates rearward.

The first stator 32 includes a first stator core 321 having a substantially annular shape and a first coil 322. The first stator core 321 has a cylindrical inner peripheral surface that is spaced apart from the outer peripheral surface of the first rotor 31 at the predetermined interval in the radial direction. The first coil 322 is attached to the first stator core 321 and has a substantially annular shape as viewed in an axial direction of the first rotation shaft RC1, that is, the vehicle width direction of the vehicle V. The first stator core 321 is provided with a plurality of fixing portions 321a protruding radially outward, and each fixing portion 321a is provided with a through hole 321b penetrating in the axial direction of the first rotation shaft RC1 Fastening bolts 33 are inserted in respective through holes 321b of the fixing portions 321a, and are fastened to the drive device case 60, whereby the first stator 32 is fixed to the drive device case 60.

The first coil 322 has three-phase windings of a U-phase winding, a V-phase winding, and a W-phase winding. The first coil 322 has a left coil end portion 322L that protrudes outward in the axial direction of the first rotation shaft RC1, that is, leftward in the vehicle width direction from a stator core left end surface 321L. The stator core left end surface 321L is an end surface of the first stator core 321 on one end side in the axial direction of the first rotation shaft RC1, that is, an end surface on a left end side in the vehicle width direction of the vehicle V in the present embodiment. Similarly, although not illustrated, the first coil 322 has a right coil end portion that protrudes outward in the axial direction of the first rotation shaft RC1, that is, rightward in the vehicle width direction from a stator core right end surface. The stator core right end surface is an end surface of the first stator core 321 on the other end side in the axial direction of the first rotation shaft RC1, that is, an end surface on a right end side in the vehicle width direction of the vehicle V in the present embodiment.

[Second Rotary Electric Machine]

The second rotary electric machine 40 is an electric motor that outputs motive power for driving the vehicle V by using electric power stored in the power storage device (not illustrated) mounted on the vehicle V or electric power generated by the first rotary electric machine 30 that is a generator. During braking of the vehicle V, the second rotary electric machine 40 may generate electric power using kinetic energy of drive wheels of the vehicle V to charge the above-described power storage device.

The second rotary electric machine 40 includes a second rotor 41 having a substantially annular shape that rotates about a second rotation shaft RC2, the second rotation shaft RC2 extending in parallel to the first rotation shaft RC1 and horizontally in the vehicle width direction of the vehicle V, and a second stator 42 that is disposed at a predetermined interval in a radial direction from an outer peripheral surface of the second rotor 41. The second rotation shaft RC2 extends in parallel to the first rotation shaft RC1 and horizontally in the vehicle width direction of the vehicle V, behind and above the first rotation shaft RC1. In the present embodiment, the second rotary electric machine 40 is disposed such that at least a part thereof overlaps the first rotary electric machine 30 in the front-rear direction when viewed in the up-down direction, and at least a part thereof overlaps the first rotary electric machine 30 in the up-down direction when viewed in the front-rear direction.

The second rotor 41 rotates clockwise as viewed from a left side in a direction of the second rotation shaft RC2 during normal driving of the second rotary electric machine 40. Accordingly, during normal driving of the second rotary electric machine 40, an upper end portion of the second rotor 41 rotates rearward.

The second stator 42 includes a second stator core 421 having a substantially annular shape and a second coil 422. The second stator core 421 has a cylindrical inner peripheral surface that is spaced apart from the outer peripheral surface of the first rotor 41 at the predetermined interval in the radial direction. The second coil 422 is attached to the second stator core 421 and has a substantially annular shape as viewed in an axial direction of the second rotation shaft RC2, that is, the vehicle width direction of the vehicle V. The second stator core 421 is provided with a plurality of fixing portions 421a protruding radially outward, and each fixing portion 421a is provided with a through hole 421b penetrating in the axial direction of the second rotation shaft RC2. Fastening bolts 43 are inserted in respective through holes 421b of the fixing portions 421a, and are fastened to the drive device case 60, whereby the second stator 42 is fixed to the drive device case 60.

The second coil 422 has three-phase windings of a U-phase winding, a V-phase winding, and a W-phase winding. The second coil 422 has a left coil end portion 422L that protrudes outward in the axial direction of the second rotation shaft RC2, that is, leftward in the vehicle width direction from a stator core left end surface 421L. The stator core left end surface 421L is an end surface of the second stator core 421 on one end side in the axial direction of the second rotation shaft RC2, that is, an end surface on a left end side in the vehicle width direction of the vehicle V in the present embodiment. Similarly, although not illustrated, the second coil 422 has a right coil end portion that protrudes outward in the axial direction of the second rotation shaft RC2, that is, rightward in the vehicle width direction from a stator core right end surface. The stator core right end surface is an end surface of the second stator core 421 on the other end side in the axial direction of the second rotation shaft RC2, that is, an end surface on a right end side in the vehicle width direction of the vehicle V in the present embodiment.

The second rotary electric machine 40 is provided with a coil guard 44 that covers at least a part of the left coil end portion 422L in a circumferential direction. The coil guard 44 covers an outer peripheral surface and a left end surface of the left coil end portion 422L in a front lower region as viewed in the vehicle width direction. The coil guard 44 is disposed so as to intersect a virtual straight line connecting the first rotation shaft RC1 of the first rotary electric machine 30 and the second rotation shaft RC2 of the second rotary electric machine 40 as viewed in the vehicle width direction.

In a case where a load is input to the drive device case 60 from the front side and the first rotary electric machine 30 is displaced rearward, for example, at the time of a frontal collision of the vehicle V, the coil guard 44 prevents direct contact between the left coil end portion 322L of the first rotary electric machine 30 and the left coil end portion 422L of the second rotary electric machine 40. Accordingly, even in the case where a load is input to the drive device case 60 from the front side and the first rotary electric machine 30 is displaced rearward, for example, at the time of a frontal collision of the vehicle V, it is possible to prevent an occurrence in which the left coil end portion 322L of the first rotary electric machine 30 and the left coil end portion 422L of the second rotary electric machine 40 come into direct contact with each other and a short circuit or the like is caused.

[Transmission Device]

The transmission device 50 is a device that is mechanically coupled to the second rotary electric machine 40, moderates the motive power output from the second rotary electric machine 40, and transmits the moderated motive power to the drive wheels. The transmission device 50 is, for example, a gear-type motive-power transmission device. The transmission device 50 may be mechanically coupled to the internal combustion engine (not illustrated) mounted on the vehicle V in addition to the second rotary electric machine 40. In this case, the transmission device 50 moderates the motive power output from the second rotary electric machine 40 and/or the motive power output from the internal combustion engine and transmits the moderated motive power to the drive wheels.

[Drive Device Case]

A first dropping pipe 61 that is disposed above the first rotary electric machine 30 and extends in the axial direction of the first rotation shaft RC1, and a second dropping pipe 62 that is disposed above the second rotary electric machine 40 and extends in the axial direction of the second rotation shaft RC2 are provided inside the drive device case 60. In the present embodiment, two first dropping pipes 61 are provided. Specifically, one first dropping pipe 61 is provided at the front side of the first rotation shaft RC1 and one first dropping pipe 61 is provided at the rear side of the first rotation shaft RC1. In addition, two second dropping pipes 62 are provided. Specifically, one second dropping pipe 62 is provided at the front side of the second rotation shaft RC2 and one second dropping pipe 62 is provided at the rear side of the second rotation shaft RC2.

In the present embodiment, a coolant is supplied to the first dropping pipes 61 and the second dropping pipes 62 from the outside of the drive device case 60. In an outer peripheral of each of the first dropping pipes 61 and an outer peripheral surface of each of the second dropping pipes 62, a plurality of dropping holes (not illustrated) opening to the lower side are formed along an axial direction of each of the first dropping pipes 61 and each of the second dropping pipes 62. The coolant supplied to the first dropping pipes 61 and the second dropping pipes 62 from the outside of the drive device case 60 is dropped onto an outer peripheral surface of the first rotary electric machine 30 from the dropping holes of the first dropping pipes 61, and is dropped onto an outer peripheral surface of the second rotary electric machine 40 from the dropping holes of the second dropping pipes 62. The coolant dropped onto the first rotary electric machine 30 from the dropping holes of the first dropping pipes 61 comes into contact with the first rotary electric machine 30 to cool the first rotary electric machine 30, and then flows down to the lower side of the first rotary electric machine 30 due to gravity. Similarly, the coolant dropped onto the second rotary electric machine 40 from the dropping holes of the second dropping pipes 62 comes into contact with the second rotary electric machine 40 to cool the second rotary electric machine 40, and then flows down to the lower side of the second rotary electric machine 40 due to gravity.

A coolant storage portion 64 is formed in a lower portion of the drive device case 60. The coolant storage portion 64 stores the coolant that cools the first rotary electric machine 30 after dropping from the dropping holes of the first dropping pipes 61, and the coolant that cools the second rotary electric machine 40 after dropping from the dropping holes of the second dropping pipes 62. That is, the coolant that cools the first rotary electric machine 30 after dropping from the dropping holes of the first dropping pipes 61 flows down to the lower side of the first rotary electric machine 30 due to gravity and is stored in the coolant storage portion 64, and the coolant that cools the second rotary electric machine 40 after dropping from the dropping holes of the second dropping pipes 62 flows down to the lower side of the second rotary electric machine 40 due to gravity and is stored in the coolant storage portion 64.

The coolant storage portion 64 is formed at a front lower portion in the drive device case 60, below the first rotary electric machine 30. In the coolant storage portion 64, the coolant is stored so that at least a part of the first rotary electric machine 30 is immersed in the coolant. Accordingly, during driving of the first rotary electric machine 30, the coolant stored in the coolant storage portion 64 is raked up by the rotating first rotor 31, and the coolant raked up by the first rotor 31 is scattered inside the drive device case 60 to adjust temperatures of the first rotary electric machine 30, the second rotary electric machine 40, the transmission device 50, and the like. Accordingly, temperature adjustment performance of the vehicle drive device 20 is improved.

[Power Distribution Component]

A first connector unit 81 and a second connector unit 82 are provided on the upper surface of the drive device case 60. In the present embodiment, the first connector unit 81 and the second connector unit 82 are provided on the upper surface of the drive device case 60 side by side in the front-rear direction such that the first connector unit 81 is at the front side and the second connector unit 82 is at the rear side. A terminal block 91 is provided inside the drive device case 60. In the present embodiment, the terminal block 91 is provided above the first rotary electric machine 30.

The first connector unit 81 is inserted through the upper surface of the drive device case 60 in the up-down direction. An upper end of the first connector unit 81 faces the upper side and is exposed from the upper surface of the drive device case 60 to the outside, and a lower end of the first connector unit 81 is positioned inside the drive device case 60.

At an upper end portion of the first connector unit 81, an external connector portion 811 including three terminal portions 811U, 811V, and 811W of a U phase, a V phase, and a W phase is provided in a portion exposed to the upper side from the upper surface of the drive device case 60. At a lower end portion of the first connector unit 81, an internal connector portion 812 including three terminal portions 812U, 812V, and 812W of a U phase, a V phase, and a W phase is provided inside the drive device case 60.

The three terminal portions 811U, 811V, and 811W of a U phase, a V phase, and a W phase of the external connector portion 811 are respectively connected to U-phase, V-phase, and W-phase conductive members electrically connected to the power conversion device (not illustrated) disposed above the drive device case 60.

Wiring members 92U, 92V, and 92W of a U phase, a V phase, and a W phase are connected to three terminal portions 91U. 91V, and 91W of a U phase, a V phase, and a W phase of the terminal block 91, respectively. One end portions of the wiring members 92U, 92V, and 92W are connected to the three terminal portions 91U, 91V, and 91W of a U phase, a V phase, and a W phase of the terminal block 91, respectively, and the other end portions of the wiring members 92U, 92V, and 92W are connected to the U-phase winding, the V-phase winding, and the W-phase winding of the first coil 322, respectively.

The second connector unit 82 is inserted through the upper surface of the drive device case 60 in the up-down direction. An upper end of the second connector unit 82 faces the upper side and is exposed from the upper surface of the drive device case 60 to the outside, and a lower end of the second connector unit 82 is positioned inside the drive device case 60.

At an upper end portion of the second connector unit 82, an external connector portion 821 including three terminal portions 821U. 821V, and 821W of a U phase, a V phase, and a W phase is provided in a portion exposed to the upper side from the upper surface of the drive device case 60. At a lower end portion of the second connector unit 82, an internal connector portion 822 including three terminal portions 822U, 822V, and 822W of a U phase, a V phase, and a W phase is provided inside the drive device case 60.

The three terminal portions 821U, 821V, and 821W of a U phase, a V phase, and a W phase of the external connector portion 821 are respectively connected to U-phase, V-phase, and W-phase conductive members electrically connected to the power conversion device (not illustrated) disposed above the drive device case 60.

Wiring members 93U, 93V, and 93W of a U phase, a V phase, and a W phase are connected to the three terminal portions 822U, 822V, and 822W of a U phase, a V phase, and a W phase of the internal connector portion 822, respectively. One end portions of the wiring members 92U, 92V, and 92W are connected to the three terminal portions 822U, 822V, and 822W of a U phase, a V phase, and a W phase of the internal connector portion 822, respectively, and the other end portions of the wiring members 93U, 93V, and 93W are connected to the U-phase winding, the V-phase winding, and the W-phase winding of the second coil 422, respectively.

The conductive unit 10 is disposed above the first rotary electric machine 30. The conductive unit 10 connects the three terminal portions 812U, 812V, and 812W of a U phase, a V phase, and a W phase of the internal connector portion 812 of the first connector unit 81 to the three terminal portions 91U, 91V, and 91W of a U phase, a V phase, and a W phase of the terminal block 91, respectively.

Accordingly, the conductive unit 10 electrically connects the first rotary electric machine 30 accommodated in the drive device case 60 to the power conversion device (not illustrated) disposed outside the drive device case 60, and transfers and receives electric power to and from the first rotary electric machine 30 accommodated in the drive device case 60.

As described, since the conductive unit 10 is disposed above the first rotary electric machine 30, it is possible to prevent the conductive unit 10 from being affected by heat generated along with driving of the first rotary electric machine 30.

[Details of Conductive Unit]

Figure 2:
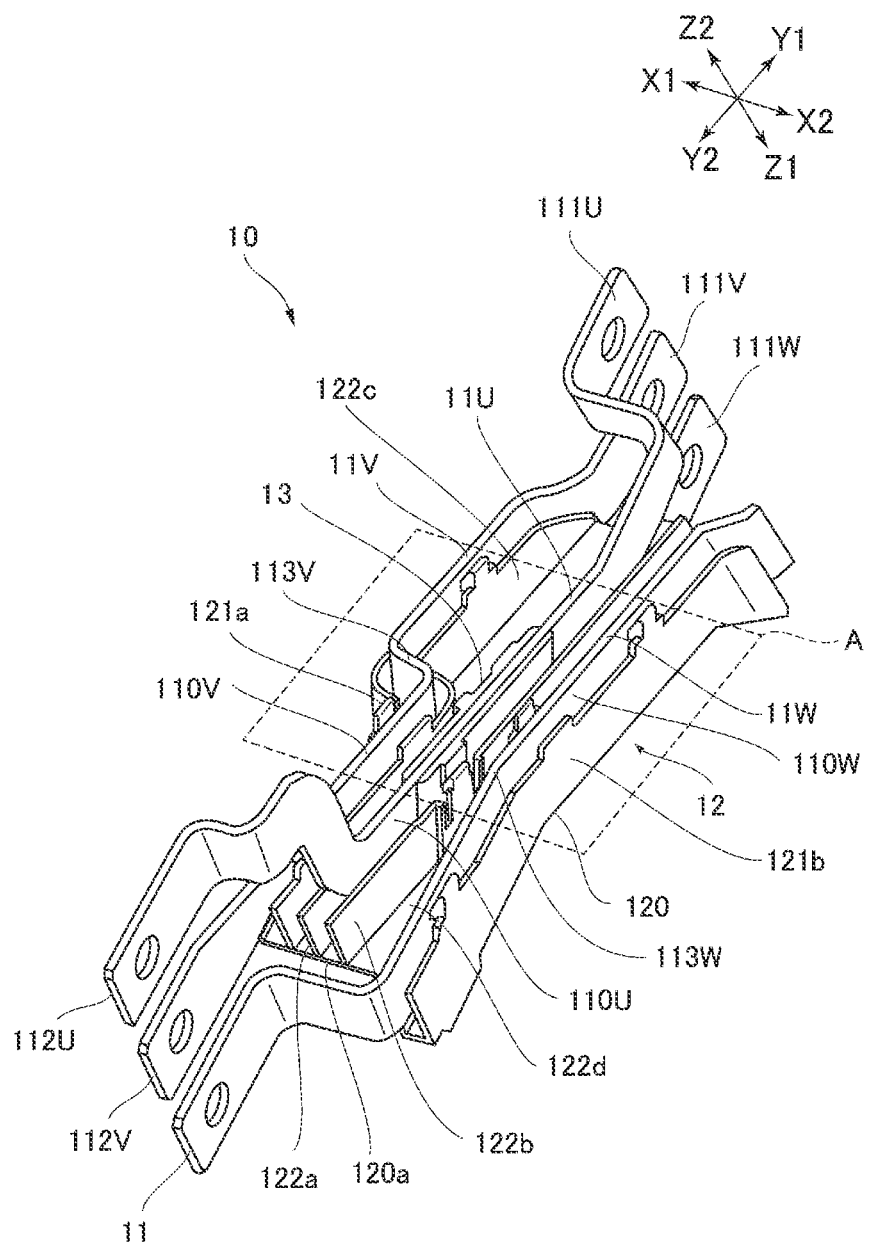
FIG. 2 is a perspective view of the conductive unit according to the embodiment of the present invention.
Figure 3:
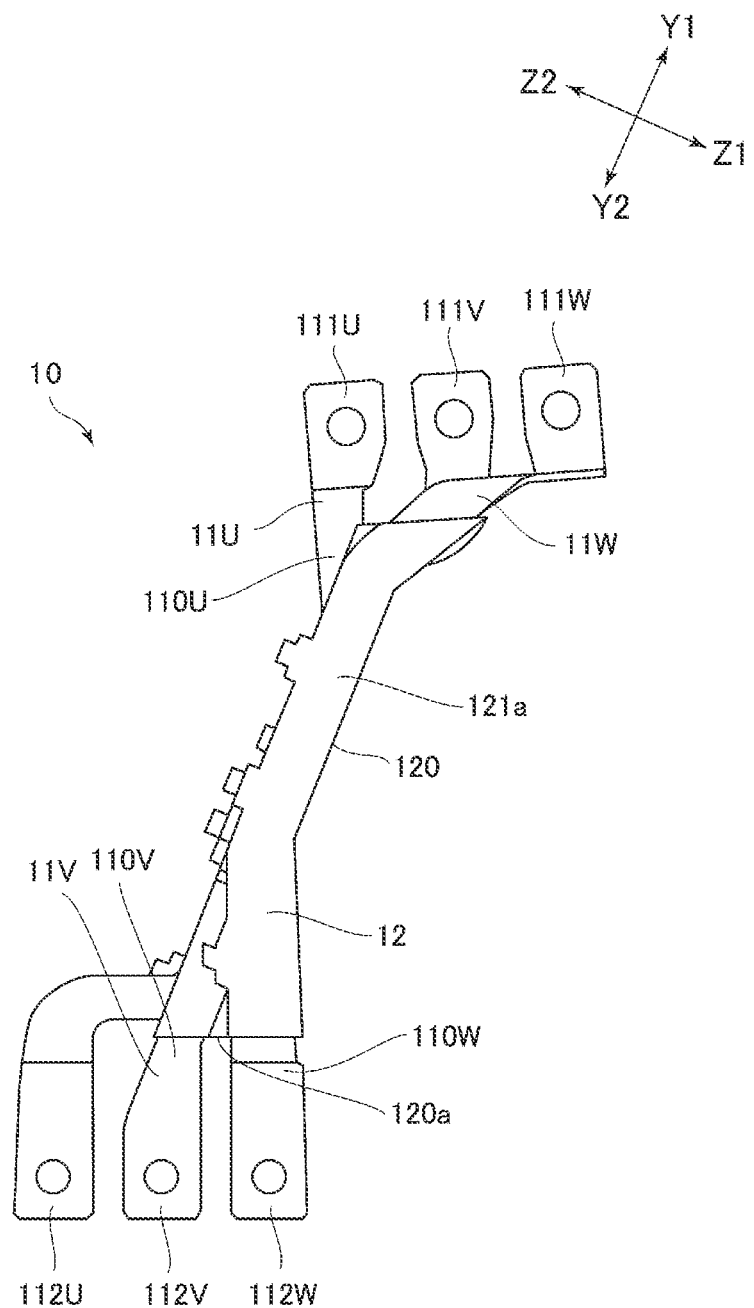
FIG. 3 is a view of the conductive unit in FIG. 2 as viewed from the other side (X2 side) in an X direction.
Figure 4:
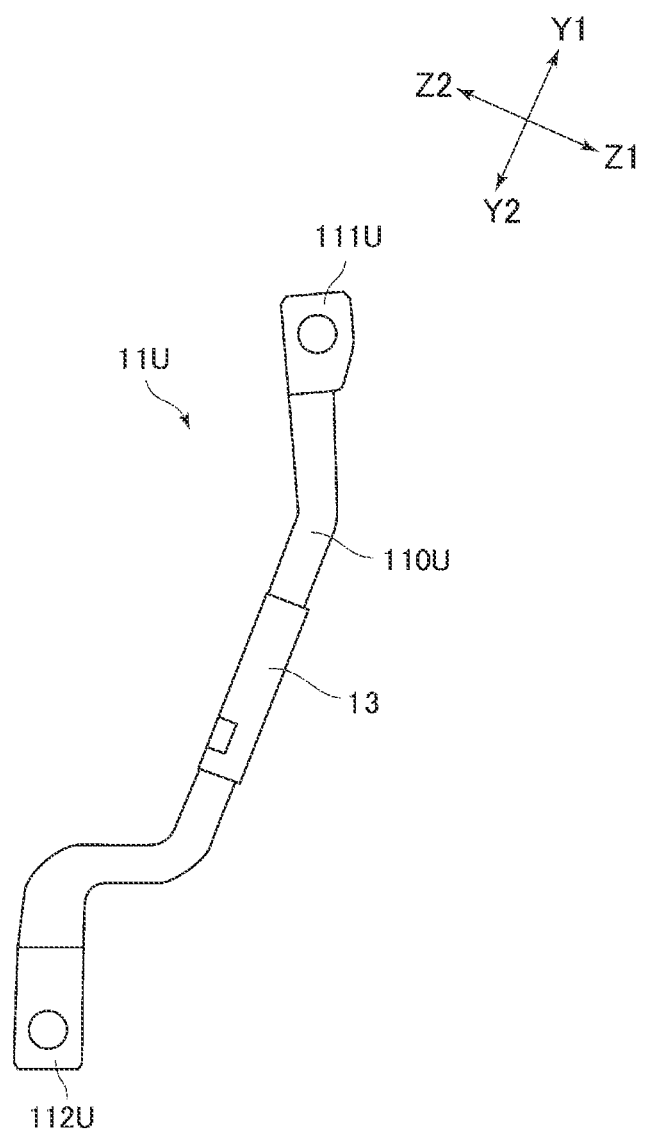
FIG. 4 is a view of a U-phase conductive member of the conductive unit in FIG. 2 as viewed from the other side (X2 side) in the X direction.
Figure 5:
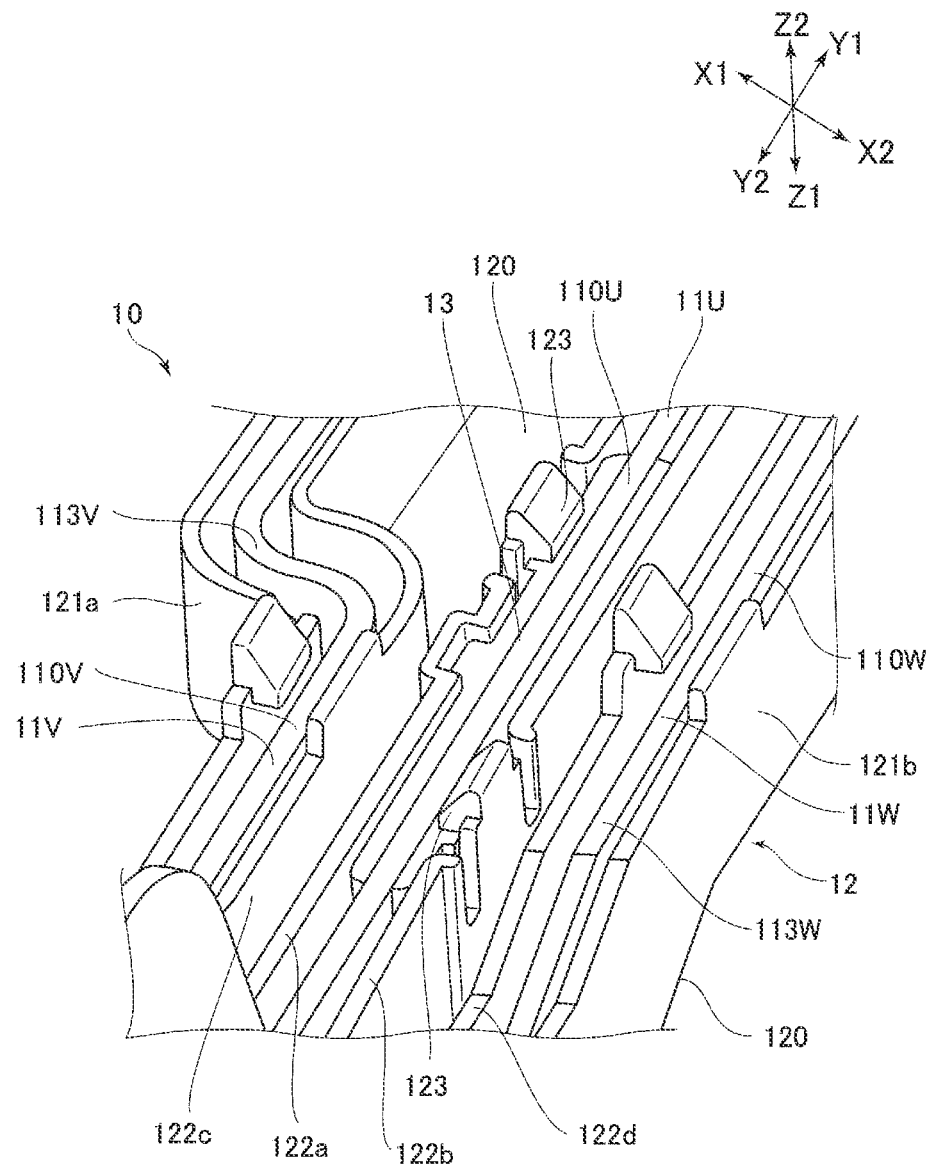
FIG. 5 is an enlarged view of a region A of the conductive unit in FIG. 2.

As illustrated in FIGS. 2 and 3, the conductive unit 10 includes a U-phase conductive member 11U, a V-phase conductive member 11V, a W-phase conductive member 11W, and an insulating cover 12.

The U-phase conductive member 11U includes a U-phase bus bar 110U and a molded member 13 molded integrally with the U-phase bus bar 110U. The molded member 13 is formed of an insulating material such as resin. In the U-phase bus bar 110U, a first end portion 111U is connected to the U-phase terminal portion 812U of the internal connector portion 812 of the first connector unit 81, and a second end portion 112U is connected to the U-phase terminal portion 91U of the terminal block 91.

The V-phase conductive member 11V includes a V-phase bus bar 110V and does not include the molded member 13. In the V-phase bus bar 110V, a first end portion 111V is connected to the V-phase terminal portion 812V of the internal connector portion 812 of the first connector unit 81, and a second end portion 112V is connected to the V-phase terminal portion 91V of the terminal block 91.

The W-phase conductive member 11W includes a W-phase bus bar 110W and does not include the molded member 13. In the W-phase bus bar 110W, a first end portion 111W is connected to the W-phase terminal portion 812W of the internal connector portion 812 of the first connector unit 81, and a second end portion 112W is connected to the W-phase terminal portion 91W of the terminal block 91.

As described, the first rotary electric machine 30 accommodated in the drive device case 60 and the power conversion device (not illustrated) disposed outside the drive device case 60 are electrically connected by the U-phase bus bar 110U, the V-phase bus bar 110V, and the W-phase bus bar 110W.

The insulating cover 12 is formed of an insulating material such as resin. The insulating cover 12 separates the bus bars of the U-phase bus bar 110U, the V-phase bus bar 110V, and the W-phase bus bar 110W from each other. The insulating cover 12 covers a part of the U-phase bus bar 110U, a part of the V-phase bus bar 110V, and a part of the W-phase bus bar 110W, and protects the bus bars.

The U-phase conductive member 110U, the V-phase conductive member 11V, and the W-phase conductive member 11W are arranged side by side in an X direction. The U-phase conductive member 11U, the V-phase conductive member 11V, and the W-phase conductive member 11W all extend in a Y direction perpendicular to the X direction.

In the present specification, in order to clarify and simplify the description, an arrangement direction of the U-phase conductive member 11U, the V-phase conductive member 11V, and the W-phase conductive member 11W is defined as the X direction, and an extending direction of the U-phase conductive member 11U, the V-phase conductive member 11V, and the W-phase conductive member 11W that is perpendicular to the X direction is defined as the Y direction, and a direction perpendicular to both the X direction and the Y direction is defined as a Z direction. In FIGS. 2 to 5, for convenience, one side in the X direction is denoted by X1, the other side in the X direction is denoted by X2, one side in the Y direction is denoted by Y1, the other side in the Y direction is denoted by Y2, one side in the Z direction is denoted by Z1, and the other side in the Z direction is denoted by Z2. Further, a side at which the first end portions 111U. 11V, and 111W of the U-phase bus bar 110U, the V-phase bus bar 110V, and the W-phase bus bar 110W are disposed is defined as one side (Y b side) in the Y direction, and a side at which the second end portions 112U, 112V, and 112W of the U-phase bus bar 110U, the V-phase bus bar 110V, and the W-phase bus bar 110W are disposed is defined as the other side (Y2 side) in the Y direction.

The U-phase conductive member 11U, the V-phase conductive member 11V, and the W-phase conductive member 11W are arranged side by side in an order of the V-phase conductive member 11V, the U-phase conductive member 11U, and the W-phase conductive member 11W from one side (X1 side) toward the other side (X2 side) in the X direction. That is, the V-phase conductive member 11V is disposed at the one side (X1 side) of the U-phase conductive member 11U in the X direction, and the W-phase conductive member 11W is disposed at the other side (X2 side) of the U-phase conductive member 11U in the X direction.

The insulating cover 12 includes a bottom portion 120, a one-side sidewall portion 121a, and an other-side sidewall portion 121b. The bottom portion 120 covers at least a part of the U-phase conductive member 11U, the V-phase conductive member 11V, and the W-phase conductive member 11W on one side (Z1 side) in the Z direction. The one-side sidewall portion 121a extends from the bottom portion 120 toward the other side (Z2 side) in the Z direction, and covers at least a part of the V-phase conductive member 11V on one side (X1 side) in the X direction that is located closest to the one side (X1 side) in the X direction among the U-phase conductive member 11U, the V-phase conductive member 11V, and the W-phase conductive member 11W. The other-side sidewall portion 121b extends from the bottom portion 120 toward the other side (Z2 side) in the Z direction, and covers at least a part of the W-phase conductive member 11W on the other side (X2 side) in the X direction that is located closest to the other side (X2 side) in the X direction among the U-phase conductive member 11U, the V-phase conductive member 11V, and the W-phase conductive member 11W.

The insulating cover 12 further includes a first insulating wall portion 122a that protrudes from the bottom portion 120 toward the other side (Z2 side) in the Z direction and that extends in the Y direction between the U-phase conductive member 11U and the V-phase conductive member 11V, and a second insulating wall portion 122b that protrudes from the bottom portion 120 toward the other side (Z2 side) in the Z direction and that extends in the Y direction between the U-phase conductive member 11U and the W-phase conductive member 11W.

The first insulating wall portion 122a covers at least a part of the U-phase conductive member 11U on the one side (X1 side) in the X direction.

The second insulating wall portion 122b covers at least a part of the U-phase conductive member 11U on the other side (X2 side) in the X direction.

The insulating cover 12 further includes a third insulating wall portion 122c that protrudes from the bottom portion 120 toward the other side (Z2 side) in the Z direction and that extends in the Y direction between the first insulating wall portion 122a and the V-phase conductive member 11V, and a fourth insulating wall portion 122d that protrudes from the bottom portion 120 toward the other side (Z2 side) in the Z direction and that extends in the Y direction between the second insulating wall portion 122b and the W-phase conductive member 11W.

The third insulating wall portion 122c covers at least a part of the V-phase conductive member 11V on the other side (X2 side) in the X direction.

The fourth insulating wall portion 122d covers at least a part of the W-phase conductive member 11W on the one side (X1 side) in the X direction.

The first insulating wall portion 122a and the second insulating wall portion 122b are respectively formed with locking claws 123 for locking the molded member 13 of the U-phase conductive member 11U. The locking claw 123 formed on the first insulating wall portion 122a protrudes from the first insulating wall portion 122a toward the other side (X2 side) in the X direction. The locking claw 123 formed on the second insulating wall portion 122b protrudes from the second insulating wall portion 122b toward the one side (X1 side) in the X direction.

The U-phase conductive member 11U is inserted to between the first insulating wall portion 122a and the second insulating wall portion 122b from the other side (Z2 side) in the Z direction. Then, the molded member 13 of the U-phase conductive member 11U is locked to the respective locking claws 123 formed on the first insulating wall portion 122a and the second insulating wall portion 122b. As described, when the locking claws 123 of the first insulating wall portion 122a and the second insulating wall portion 122b lock the molded member 13, the insulating cover 12 is supported by the molded member 13.

In this way, the insulating cover 12 is supported only by the molded member 13.

In a state where the insulating cover 12 is supported by the molded member 13 of the U-phase conductive member 11U, the first end portions 111U, 111V, and 111W of the U-phase bus bar 110U, the V-phase bus bar 110V, and the W-phase bus bar 110W are respectively connected to the terminal portions 812U, 812V, and 812W of the internal connector portion 812 of the first connector unit 81, and the second end portions 112U, 112V, and 112W of the U-phase bus bar 110U, the V-phase bus bar 110V, and the W-phase bus bar 110W are respectively connected to the terminal portions 91U, 91V, and 91W of the terminal block 91, the V-phase conductive member 11V is disposed so as to be inserted between the one-side sidewall portion 121a and the third insulating wall portion 122c, and the W-phase conductive member 11W is disposed so as to be inserted between the other-side sidewall portion 121b and the fourth insulating wall portion 122d.

As described above, the insulating cover 12 that separates conductors of a plurality of conductive members, that is, the bus bars of the U-phase bus bar 110U, the V-phase bus bar 110V, and the W-phase bus bar 110W in the present embodiment from each other is supported only by the molded member 13, and thus the insulating cover 12 can be fixed without providing the insulating cover 12 with a fixing portion for fixing the insulating cover 12 to another member such as the drive device case 60. Accordingly, it is possible to achieve cost reduction and weight reduction while ensuring insulation properties among the conductors of the plurality of conductive members, that is, among the bus bars of the U-phase bus bar 110U, the V-phase bus bar 110V, and the W-phase bus bar 110W in the present embodiment.

Further, the V-phase conductive member 11V is disposed at the one side (X1 side) of the U-phase conductive member 11U having the molded member 13 in the X direction, and the W-phase conductive member 11W is disposed at the other side (X2 side) of the U-phase conductive member 11U having the molded member 13 in the X direction. Thus, among the U-phase conductive member 11U, the V-phase conductive member 11V, and the W-phase conductive member 11W arranged side by side in the X direction, the U-phase conductive member 11U located at a center includes the molded member 13, and the insulating cover 12 is supported by the molded member 13 of the U-phase conductive member 11U located at the center. Accordingly, the insulating cover 12 is supported more stably than by a conductive member positioned at an end, that is, the V-phase conductive member 11V or the W-phase conductive member 11W in the present embodiment among the U-phase conductive member 11U, the V-phase conductive member 11V, and the W-phase conductive member 11W arranged side by side in the X direction.

Subsequently, a description will be given of the conductive unit 10 in a state where the insulating cover 12 is supported by the molded member 13 of the U-phase conductive member 11U, the first end portions 111U, 111V, and 111W of the U-phase bus bar 110U, the V-phase bus bar 110V, and the W-phase bus bar 110W are respectively connected to the terminal portions 812U. 812V, and 812W of the internal connector portion 812 of the first connector unit 81, and the second end portions 112U. 112V, and 112W of the U-phase bus bar 110U, the V-phase bus bar 110V, and the W-phase bus bar 110W are respectively connected to the terminal portions 91U, 91V, and 91W of the terminal block 91.

The first end portions 111U, 111V, and 111W of the bus bars 110U, 110V, and 110W of the U-phase conductive member 11U, the V-phase conductive member 11V, and the W-phase conductive member 11W are formed so as to be exposed from the insulating cover 12 and to be located at positions spaced apart from each other in the Z direction. Similarly, the second end portions 112U, 112V, and 112W of the bus bars 110U. 110V, and 110W of the U-phase conductive member 11U, the V-phase conductive member 11V, and the W-phase conductive member 11W are formed so as to be exposed from the insulating cover 12 and to be located at positions spaced apart from each other in the Z direction.

Accordingly, the first end portions 111U, 111V, and 111W and the second end portions 112U. 112V, and 112W of the bus bars 110U. 110V, and 110W of the U-phase conductive member 11U, the V-phase conductive member 11V, and the W-phase conductive member 11W are formed so as to be located at positions spaced apart from each other in the Z direction, and thus insulation properties of the first end portions 111U. 111V, and 111W exposed from the insulating cover 12 and of the second end portions 112U. 112V, and 112W exposed from the insulating cover 12 are improved.

Further, in the V-phase bus bar 110V, a bent portion 113V bent to a side away from the U-phase conductive member 11U in the X direction, that is, to the one side (X1 side) in the X direction is provided in a region that is sandwiched between the one-side sidewall portion 121a and the first insulating wall portion 122a of the insulating cover 12 and that overlaps the molded member 13 as viewed from the X direction.

In addition, in the W-phase bus bar 110W, a bent portion 113W bent to a side away from the U-phase conductive member 11U in the X direction, that is, to the other side (X2 side) in the X direction is provided in a region that is sandwiched between the other-side sidewall portion 121b and the second insulating wall portion 122b of the insulating cover 12 and that overlaps the molded member 13 as viewed from the X direction.

Accordingly, in a region not overlapping the molded member 13 as viewed from the X direction, the V-phase bus bar 110V and the U-phase conductive member 11U can be spaced apart at a distance in the X direction and the W-phase bus bar 110W and the U-phase conductive member 11U can be spaced apart at a distance in the X direction. Thus, insulation properties of the bus bars of the U-phase bus bar 110U, the V-phase bus bar 110V, and the W-phase bus bar 110W can be further improved.

A portion of the U-phase bus bar 110U near the first end portion 111U is bent toward the other side (Z2 side) in the Z direction and is exposed from the insulating cover 12 toward the other side (Z2 side) in the Z direction and toward the one side (Y1 side) in the Y direction. The first end portion 111U of the U-phase bus bar 110U is exposed to the other side (Z2 side) in the Z direction and the one side (Y1 side) in the Y direction of the insulating cover 12.

The first end portion 111V of the V-phase bus bar 110V is exposed to the one side (Y1 side) in the Y direction of the insulating cover 12, and is located at the one side (Z1 side) in the Z direction of the first end portion 111U of the U-phase bus bar 110U.

A portion of the W-phase bus bar 110W near the first end portion 111W is bent to the one side (Z1 side) in the Z direction and is exposed to the one side (Y1 side) in the Y direction from the insulating cover 12. The first end portion 111W of the W-phase bus bar 110W is exposed to the one side (Y1 side) in the Y direction of the insulating cover 12, and is located at the one side (Z1 side) in the Z direction of the first end portion 111V of the V-phase bus bar 110V.

In this way, the first end portion 111U of the U-phase bus bar 110U, the first end portion 111V of the V-phase bus bar 110V, and the first end portion 111W of the W-phase bus bar 110W are arranged side by side in the Z direction in an order of the first end portion 111W of the W-phase bus bar 110W, the first end portion 111V of the V-phase bus bar 110V, and the first end portion 111U of the U-phase bus bar 110U from the one side (Z1 side) in the Z direction toward the other side (Z2 side) in the Z direction. The first end portion 111U of the U-phase bus bar 110U, the first end portion III V of the V-phase bus bar 110V, and the first end portion 111W of the W-phase bus bar 110W are located at substantially the same position in the X direction.

A portion of the U-phase bus bar 110U near the second end portion 112U is bent toward the other side (Z2 side) in the Z direction and is exposed from the insulating cover 12 toward the other side (Z2 side) in the Z direction and toward the other side (Y2 side) in the Y direction. The second end portion 112U of the U-phase bus bar 110U is exposed to the other side (Z2 side) in the Z direction and the other side (Y2 side) in the Y direction of the insulating cover 12.

The second end portion 112V of the V-phase bus bar 110V is exposed to the other side (Y2 side) in the Y direction of the insulating cover 12, and is located at the one side (Z1 side) in the Z direction of the second end portion 112U of the U-phase bus bar 110U.

A portion of the W-phase bus bar 110W near the second end portion 112W is bent to the one side (Z1 side) in the Z direction and is exposed to the other side (Y2 side) in the Y direction from the insulating cover 12. The second end portion 112W of the W-phase bus bar 110W is exposed to the other side (Y2 side) in the Y direction of the insulating cover 12, and is located at the one side (Z1 side) in the Z direction of the second end portion 112V of the V-phase bus bar 110V.

In this way, the second end portion 112U of the U-phase bus bar 110U, the second end portion 112V of the V-phase bus bar 110V, and the second end portion 112W of the W-phase bus bar 110W are arranged side by side in the Z direction in an order of the second end portion 112W of the W-phase bus bar 110W, the second end portion 112V of the V-phase bus bar 110V, and the second end portion 112U of the U-phase bus bar 110U from the one side (Z1 side) in the Z direction toward the other side (Z2 side) in the Z direction. The second end portion 112U of the U-phase bus bar 110U, the second end portion 112V of the V-phase bus bar 110V, and the second end portion 112W of the W-phase bus bar 110W are located at substantially the same position in the X direction.

[Arrangement of Conductive Unit in Drive Device Case]

Next, returning to FIG. 1, the arrangement of the conductive unit 10 in the drive device case 60 will be described.

The conductive unit 10 is disposed inside the drive device case 60 such that the X direction is parallel to the first rotation shaft RC1 of the first rotary electric machine 30, that is, parallel to the vehicle width direction, the one side (X1 side) in the X direction is the right side, and the other side (X2 side) in the X direction is the left side.

In addition, the conductive unit 10 is disposed inside the drive device case 60 such that the Y direction extends in the up-down direction in a manner of being inclined to a rotation direction side of the upper end portion 31a of the first rotor 31 of the first rotary electric machine with respect to a vertical direction while going toward the upper side, the one side (Y1 side) in the Y direction is the upper side, and the other side (Y2 side) in the Y direction is the lower side. In the present embodiment, the conductive unit 10 is disposed inside the drive device case 60 such that the Y direction extends in the up-down direction in a manner of being inclined to the rear side while going toward the upper side, the one side (Y1 side) in the Y direction is the upper side, and the other side (Y2 side) in the Y direction is the lower side.

The conductive unit 10 is disposed inside the drive device case 60 such that the one side (Z1 side) in the Z direction thereof is directed toward the second rotary electric machine and the other side (Z2 side) in the Z direction thereof is directed toward the upper side in the Z direction. In the present embodiment, the conductive unit 10 is disposed inside the drive device case 60 such that the one side (Z1 side) in the Z direction thereof is directed toward a lower rear direction and the other side (Z2 side) in the Z direction thereof is directed toward an upper front direction.

The conductive unit 10 is disposed inside the drive device case 60 such that a lower end portion 120a of the bottom portion 120 of the insulating cover 12 is located at a position overlapping the first rotary electric machine 30 as viewed from the vertical direction. Further, the conductive unit 10 is disposed inside the drive device case 60, such that the bottom portion 120 of the insulating cover 12 faces the outer peripheral surface of the second rotary electric machine 40 and covers at least a part of the outer peripheral surface of the second rotary electric machine 40 in the circumferential direction of the second rotary electric machine 40.

As described above, the conductive unit 10 is disposed inside the drive device case 60 such that the X direction extends in parallel to the first rotation shaft RC1 of the first rotary electric machine 30, the Y direction extends in the up-down direction in a manner of being inclined to the rotation direction side of the upper end portion 31a of the first rotor 31 of the first rotary electric machine 30 with respect to the vertical direction while going toward the upper side, the other side (Z2 side) in the Z direction is directed toward the upper side in the Z direction, and the lower end portion 120a of the bottom portion 120 of the insulating cover 12 is located at a position overlapping the first rotary electric machine 30 as viewed from the vertical direction. Accordingly, during driving of the first rotary electric machine 30, a part of the coolant raked up from the coolant storage portion 64 by the rotating first rotor 31 is received by the bottom portion 120 of the insulating cover 12, and flows along the bottom portion 120 between the one-side sidewall portion 121a and the first insulating wall portion 122a of the insulating cover 12, between the first insulating wall portion 122a and the second insulating wall portion 122b, and between the second insulating wall portion 122b and the other-side sidewall portion 121b. The conductive unit 10 is disposed inside the drive device case 60 such that the lower end portion 120a of the bottom portion 120 of the insulating cover 12 is located at a position overlapping the first rotary electric machine 30 as viewed from the vertical direction. Accordingly, the coolant flowing along the bottom portion 120 between the one-side sidewall portion 121a and the first insulating wall portion 122a of the insulating cover 12, between the first insulating wall portion 122a and the second insulating wall portion 122b, and between the second insulating wall portion 122b and the other-side sidewall portion 121b flows down to the first rotary electric machine 30 from the lower end portion 120a of the bottom portion 120.

Accordingly, during driving of the first rotary electric machine 30, the coolant raked up from the coolant storage portion 64 by the rotating first rotor 31 can be supplied to the first rotary electric machine 30, thereby improving cooling performance for the first rotary electric machine 30.

Further, the conductive unit 10 is disposed such that the one side (Z1 side) in the Z direction thereof is directed toward the second rotary electric machine 40 and that the bottom portion 120 of the insulating cover 12 faces the outer peripheral surface of the second rotary electric machine 40 and covers at least a part of the outer peripheral surface of the second rotary electric machine 40 in the circumferential direction of the second rotary electric machine 40. Thus, the coolant raked up from the coolant storage portion 64 by the rotating first rotor 31 can be prevented from scattering to the second rotary electric machine 40.

Although one embodiment of the present invention has been described above with reference to the accompanying drawings, it is needless to say that the present invention is not limited to the embodiment. It is apparent that those skilled in the art can conceive various modifications and alterations within the scope described in the claims, and it is also understood that such modifications and alterations naturally fall within the technical scope of the present invention. In addition, the constituent elements in the above embodiment may be freely combined without departing from the spirit of the invention.

For example, in the present embodiment, an arrangement order of the first end portions 111U, 111V, and 111W of the bus bars 110U, 110V, and 110W of the U-phase conductive member 11U, the V-phase conductive member 11V, and the W-phase conductive member 11W in the Z direction and an arrangement order of the second end portions 112U, 112V, and 112W of the bus bars 110U, 110V, and 110W of the U-phase conductive member 11U, the V-phase conductive member 11V, and the W-phase conductive member 11W in the Z direction are the same arrangement order of the W phase, the V phase, and the U phase from the one side (Z1 side) in the Z direction toward the other side (Z2 side) in the Z direction.

However, the arrangement order of the first end portions 111U, 111V, and 111W of the bus bars 110U, 110V, and 110W of the U-phase conductive member 11U, the V-phase conductive member 11V, and the W-phase conductive member 11W in the Z direction and the arrangement order of the second end portions 112U, 112V, and 112W of the bus bars 110U, 110V, and 110W of the U-phase conductive member 11U, the V-phase conductive member 11V, and the W-phase conductive member 11W in the Z direction may be different from each other.

In this way, the bus bars 110U, 110V, and 110W of the U-phase conductive member 11U, the V-phase conductive member 11V, and the W-phase conductive member 11W are formed so as to be three-dimensionally spaced apart from the insulating cover 12, and thus it is possible to further improve insulation properties of the bus bars 110U, 110V, and 110W.

For example, in the present embodiment, the conductive unit 10 transfers and receives electric power to and from the first rotary electric machine 30. Alternatively, the conductive unit 10 may transfer and receive electric power to and from a device different from the first rotary electric machine.

The present specification describes at least the following matters. In the parentheses, the corresponding constituent elements and the like in the above-described embodiment are shown as an example, and the present invention is not limited thereto.

(1) A conductive unit (conductive unit 10), including:
a plurality of conductive members (U-phase conductive member 11U, V-phase conductive member 11V); and
an insulating member (insulating cover 12),
in which the plurality of conductive members include
a first conductive member (U-phase conductive member 11U) including a conductor (U-phase bus bar 110U) and a molded member (molded member 13) molded integrally with the conductor, and
a second conductive member (V-phase conductive member 11V) including a conductor (V-phase bus bar 110V) and not including the molded member, and
in which the insulating member spaces the conductors of the plurality of conductive members apart from each other and is supported only by the molded member.

According to (1), since the insulating member that spaces the conductors of the plurality of conductive members apart from each other is supported only by the molded member, the insulating member can be fixed without providing the insulating member with a fixing portion for fixing the insulating member. Accordingly, it is possible to achieve cost reduction and weight reduction while ensuring insulation properties of the plurality of conductive members.

(2) The conductive unit according to (1),
in which the plurality of conductive members include
a third conductive member (W-phase conductive member 11W) including a conductor (W-phase bus bar 110W) and not including the molded member.
in which the first conductive member, the second conductive member, and the third conductive member are arranged side by side in a first direction (X direction),
in which the second conductive member is disposed at one side (X1 side) of the first conductive member in the first direction, and
in which the third conductive member is disposed at the other side (X2 side) of the first conductive member in the first direction.

According to (2), among the three conductive members arranged side by side in the first direction, the first conductive member located at a center includes the molded member, and the insulating member is supported by the molded member of the first conductive member located at the center in the first direction. Accordingly, the insulating member is supported more stably than by a conductive member located at an end among the first conductive member, the second conductive member, and the second conductive member arranged side by side in the first direction.

(3) The conductive unit according to (2),
in which each of the conductors of the second conductive member and the third conductive member is provided with a bent portion (bent portions 113V and 113W), which is bent to a side away from the first conductive member in the first direction, in a region overlapping the molded member as viewed from the first direction.

According to (3), in a region not overlapping the molded member as viewed from the first direction, the conductor of the second conductive member and the first conductive member can be spaced apart at a distance in the first direction and the conductor of the third conductive member and the first conductive member can be spaced apart at a distance in the first direction, and thus insulation properties of the conductors are further improved.

(4) The conductive unit according to (2) or (3),
in which the first conductive member, the second conductive member, and the third conductive member all extend in a second direction (Y direction) perpendicular to the first direction,
in which first end portions (first end portions 111U, 111V, and 111W) of the respective conductors of the first conductive member, the second conductive member, and the third conductive member at one side (Y1 side) in the second direction are formed so as to be exposed from the insulating member and to be located at positions spaced apart from each other in a third direction (Z direction) perpendicular to both the first direction and the second direction, and
in which second end portions (second end portions 112U, 112V, and 112W) of the respective conductors of the first conductive member, the second conductive member, and the third conductive member at the other side in the second direction are formed so as to be exposed from the insulating member and to be located at positions spaced apart from each other in the third direction.

According to (4), since the first end portions and the second end portions of the conductors of the first conductive member, the second conductive member, and the third conductive member are formed so as to be located at positions spaced apart from each other in the third direction, it is possible to improve insulation properties of the first end portions exposed from the insulating member and of the second end portions exposed from the insulating member.

(5) The conductive unit according to (4),
in which an arrangement order of the first end portions of the respective conductors of the first conductive member, the second conductive member, and the third conductive member in the third direction is different from an arrangement order of the second end portions of the respective conductors of the first conductive member, the second conductive member, and the third conductive member in the third direction.

According to (5), since the conductors of the first conductive member, the second conductive member, and the third conductive member are formed so as to be three-dimensionally spaced apart from the insulating member, insulation properties of the conductors can be further improved.

(6) The conductive unit according to any one of (1) to (5),
in which the conductive unit electrically connects a first rotary electric machine (first rotary electric machine 30) accommodated in a rotary electric machine case (drive device case 60) to an outside of the rotary electric machine case, and is disposed above the first rotary electric machine.

According to (6), since the conductive unit is disposed above the first rotary electric machine, it is possible to prevent the conductive unit from being affected by heat generated along with driving of the first rotary electric machine.

(7) The conductive unit according to (6),
in which the first rotary electric machine includes a first rotor (first rotor 31) and a first stator (first stator 32),
in which a rotation shaft (first rotation shaft RC1) of the first rotary electric machine extends in a horizontal direction.
in which a coolant storage portion (coolant storage portion 64) in which a coolant is stored so that at least a part of the first rotary electric machine is immersed in the coolant is formed at a lower portion in the rotary electric machine case,
in which the first conductive member and the second conductive member are arranged side by side in a first direction (X direction), and extend in a second direction (Y direction) perpendicular to the first direction,
in which the insulating member includes
a bottom portion (bottom portion 120) that covers at least a part of the first conductive member and the second conductive member at one side (Z1 side) in a third direction (Z direction) perpendicular to both the first direction and the second direction, and
a first insulating wall portion (first insulating wall portion 122a) that protrudes from the bottom portion to the other side (Z2 side) in the third direction and extends in the second direction between the first conductive member and the second conductive member,
in which the first direction extends in parallel to the rotation shaft of the first rotary electric machine,
in which the second direction extends in the up-down direction in a manner of being inclined to a rotation direction side of an upper end portion (upper end portion 31a) of the first rotor with respect to a vertical direction while going toward an upper side,
in which the other side in the third direction is directed toward an upper side in the third direction, and
in which a lower end portion (lower end portion 120a) of the bottom portion is disposed at a position overlapping the first rotary electric machine as viewed from the vertical direction.

According to (7), during driving of the first rotary electric machine, a part of the coolant raked up from the coolant storage portion by the rotating first rotor is received by the bottom portion of the insulating member and flows along the bottom portion of the insulating member. Since the conductive unit is disposed such that the lower end portion of the bottom portion of the insulating member is located at a position overlapping the first rotary electric machine as viewed from the vertical direction, the coolant flowing along the bottom portion of the insulating member flows down from the lower end portion of the bottom portion to the first rotary electric machine. Accordingly, during driving of the first rotary electric machine, the coolant raked up from the coolant storage portion by the rotating first rotor can be supplied to the first rotary electric machine, and thus cooling performance for the first rotary electric machine is improved.

(8) The conductive unit according to (7),
in which a second rotary electric machine (second rotary electric machine 40) is accommodated in the rotary electric machine case,
in which the conductive unit is disposed such that the one side in the third direction thereof is directed toward the second rotary electric machine, and
the bottom portion faces an outer peripheral surface of the second rotary electric machine, and covers at least a part of the outer peripheral surface of the second rotary electric machine in a circumferential direction of the second rotary electric machine.

According to (8), the coolant raked up from the coolant storage portion by the rotating first rotor can be prevented from scattering to the second rotary electric machine.

What is claimed is:

1. A conductive unit, comprising:
a plurality of conductive members; and
an insulating member,
wherein the plurality of conductive members include
a first conductive member including a conductor and a molded member molded integrally with the conductor, and
a second conductive member including a conductor and not including the molded member, and
wherein the insulating member spaces the conductors of the plurality of conductive members apart from each other and is supported only by the molded member.

2. The conductive unit according to claim 1,
wherein the plurality of conductive members include
a third conductive member including a conductor and not including the molded member,
wherein the first conductive member, the second conductive member, and the third conductive member are arranged side by side in a first direction,
wherein the second conductive member is disposed at one side of the first conductive member in the first direction, and
wherein the third conductive member is disposed at the other side of the first conductive member in the first direction.

3. The conductive unit according to claim 2,
wherein each of the conductors of the second conductive member and the third conductive member is provided with a bent portion, which is bent to a side away from the first conductive member in the first direction, in a region overlapping the molded member as viewed from the first direction.

4. The conductive unit according to claim 2,
wherein the first conductive member, the second conductive member, and the third conductive member all extend in a second direction perpendicular to the first direction,
wherein first end portions of the respective conductors of the first conductive member, the second conductive member, and the third conductive member at one side in the second direction are formed so as to be exposed from the insulating member and to be located at positions spaced apart from each other in a third direction perpendicular to both the first direction and the second direction, and
wherein second end portions of the respective conductors of the first conductive member, the second conductive member, and the third conductive member at the other side in the second direction are formed so as to be exposed from the insulating member and to be located at positions spaced apart from each other in the third direction.

5. The conductive unit according to claim 4,
wherein an arrangement order of the first end portions of the respective conductors of the first conductive member, the second conductive member, and the third conductive member in the third direction is different from an arrangement order of the second end portions of the respective conductors of the first conductive member, the second conductive member, and the third conductive member in the third direction.

6. The conductive unit according to claim 1,
wherein the conductive unit electrically connects a first rotary electric machine accommodated in a rotary electric machine case to an outside of the rotary electric machine case, and is disposed above the first rotary electric machine.

7. The conductive unit according to claim 6,
wherein the first rotary electric machine includes a first rotor and a first stator,
wherein a rotation shaft of the first rotary electric machine extends in a horizontal direction,
wherein a coolant storage portion in which a coolant is stored so that at least a part of the first rotary electric machine is immersed in the coolant is formed at a lower portion in the rotary electric machine case,
wherein the first conductive member and the second conductive member are arranged side by side in a first direction, and extend in a second direction perpendicular to the first direction,
wherein the insulating member includes
a bottom portion that covers at least a part of the first conductive member and the second conductive member at one side in a third direction perpendicular to both the first direction and the second direction, and
a first insulating wall portion that protrudes from the bottom portion to the other side in the third direction and extends in the second direction between the first conductive member and the second conductive member,
wherein the first direction extends in parallel to the rotation shaft of the first rotary electric machine,
wherein the second direction extends in the up-down direction in a manner of being inclined to a rotation direction side of an upper end portion of the first rotor with respect to a vertical direction while going toward an upper side,
wherein the other side in the third direction is directed toward an upper side in the third direction, and
wherein a lower end portion of the bottom portion is disposed at a position overlapping the first rotary electric machine as viewed from the vertical direction.

8. The conductive unit according to claim 7,
wherein a second rotary electric machine is accommodated in the rotary electric machine case,
wherein the conductive unit is disposed such that
the one side in the third direction thereof is directed toward the second rotary electric machine, and
the bottom portion faces an outer peripheral surface of the second rotary electric machine, and covers at least a part of the outer peripheral surface of the second rotary electric machine in a circumferential direction of the second rotary electric machine.

* * * * *